I. J. WARNER.
Device for Stopping Horses.
No. 222,105.   Patented Nov. 25, 1879.
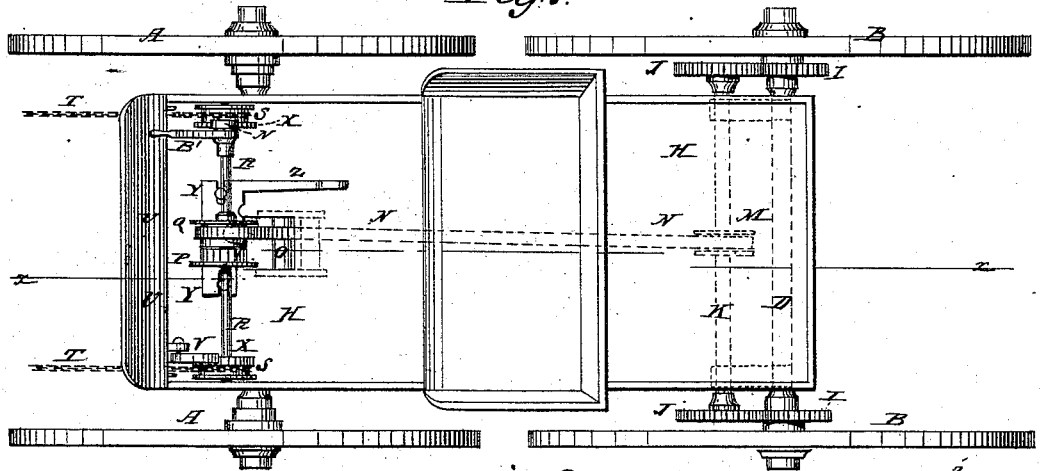
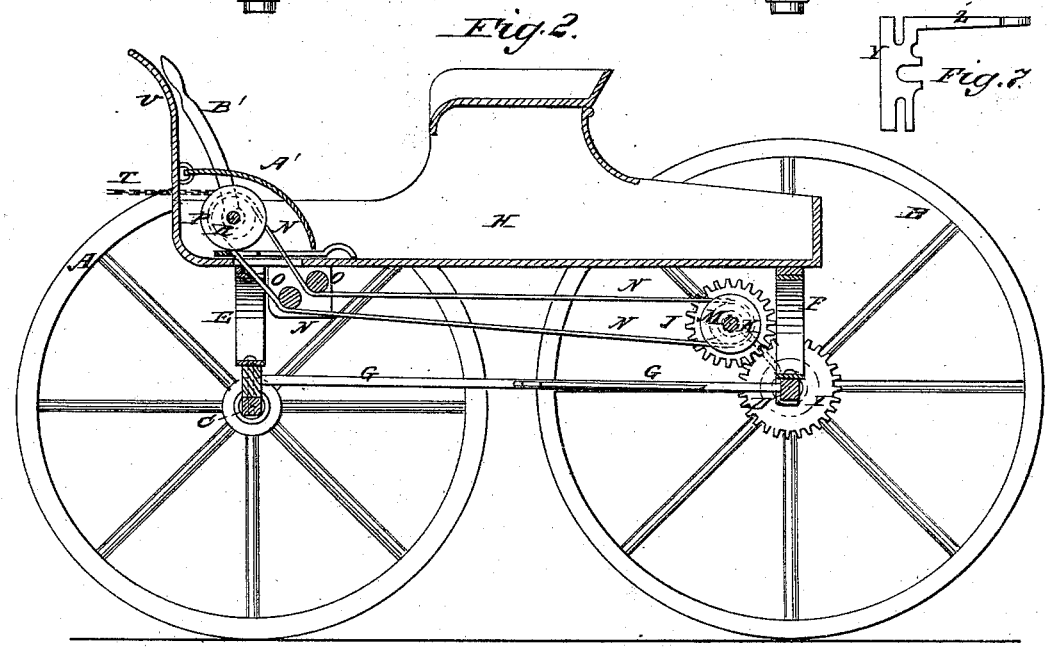
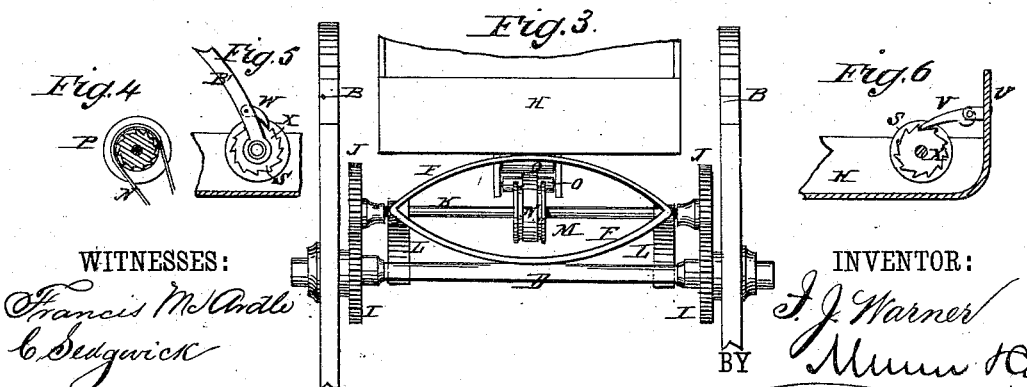
WITNESSES:
Francis McArdle
C. Sedgwick
INVENTOR:
I. J. Warner
BY Munn & Co.
ATTORNEYS.

UNITED STATES PATENT OFFICE

ISAAC J. WARNER, OF WATERTOWN, CONNECTICUT.

IMPROVEMENT IN DEVICES FOR STOPPING HORSES.

Specification forming part of Letters Patent No. 222,105, dated November 25, 1879; application filed October 2, 1879.

*To all whom it may concern:*

Be it known that I, ISAAC JONES WARNER, of Watertown, in the county of Litchfield and State of Connecticut, have invented a new and Improved Device for Stopping Horses, of which the following is a specification.

Figure 1 is a plan view of my improvement, shown as applied to a buggy. Fig. 2 is a sectional elevation taken through the line $x\ x$, Fig. 1. Fig. 3 is an end elevation. Figs. 4, 5, 6, and 7 are detailed views of some of the operating parts.

Similar letters of reference indicate corresponding parts.

The object of this invention is to furnish an attachment to vehicles for applying power to check and hold a horse.

The invention consists in combining with a vehicle a mechanism for pulling upon the bit of a horse, so constructed that power may be applied to the mechanism by operating a lever, or from the running-gearing of a vehicle, to check and hold the horse should he become frightened or fractious, as will be hereinafter fully described.

A represents the forward wheels; B, the rear wheels; C, the forward axle; D, the rear axle; E, the forward spring; F, the rear springs; G, the reach, and H the body of the vehicle, all of which parts are constructed in the usual way.

To the hubs of the rear wheels, B, are attached two gear-wheels, I, the teeth of which mesh into the teeth of the two gear-wheels J, attached to the ends of the shaft K. The shaft K revolves in bearings in supports L, attached to the axle D, which supports are inclined forward, so that the shaft K and its attachments may not interfere with the play of the springs F. To the middle part of the shaft K is attached a pulley, M, around which passes a belt or chain, N.

The pulley M is flanged, to keep the belt or chain N in place. The parts of the belt or chain N pass around two guide-pulleys, O, pivoted to a support attached to the lower side of the forward part of the bottom of the body H. From the guide-pulleys O the band or chain N passes to the pulleys P Q, placed upon the shaft R, which crosses the forward part of the body H, and revolves in bearings attached to the said body H.

The pulley P is rigidly attached to the shaft R, so as to carry the said shaft R with it in its revolution, and the pulley Q runs loose upon the said shaft R. The pulleys P Q are placed side by side, so that the belt or chain N may be readily moved from one to the other.

The pulleys have flanges upon their outer sides, so that the belt or chain N cannot slip off. To the ends of the shaft R are attached two fixed pulleys, S, to which are attached the rear ends of two light, but strong, chains or cords, T. The chains or cords T pass through holes in the dash-board U, pass forward at the sides of the horse, and their forward ends are attached to the check-reins or bits of the harness.

With this construction, when the bolt or chain N is upon the fixed pulley R, the forward movement of the vehicle will turn the shaft R and wind the chains or cords T upon the pulleys S, drawing the horse back and checking him. When the belt or chain is upon the loose pulley Q the forward movement of the vehicle will not turn the shaft R, and the chains or cords T will remain slack.

The belt or chain N is slipped from one to the other of the pulleys P Q by the sliding plate Y, which is slotted or notched to receive the belt or chain N, and also to receive the bolts or screws that secure it to the vehicle-body H. The shifting-plate Y is provided with an arm, Z, so that it may be moved to shift the belt by the driver with either his hand or foot.

The shaft R is held in place, holding the chains or cords T taut, by pawls V W, which engage with the teeth of ratchet-wheels X, formed upon or attached to the pulleys S or the shaft R. The pawl V is pivoted to the dash-board U or the body H of the vehicle. The pawl W is pivoted to a lever, B', the lower end of which is pivoted to the shaft R.

With this construction the shaft R may be turned to tighten the chains or cords T by operating the lever B' by hand. The lever B' thus allows the chains or cords T to be tightened to hold the horse when the vehicle is standing still, and also allows the device to be applied to sleighs and other vehicles without wheels.

The shaft R and its attachments are covered and protected by a curved plate or apron, A', hinged to the dash-board U.

I am aware that a lever, segment, and rack-bar have been combined with a sliding frame, cog-wheels, and windlass to form a horse-stopping device; but

What I claim as new and of my invention is—

1. The combination, with the body H of a vehicle, of the shaft R, the pulleys S, the chains T, connected with the harness-bit, the ratchets and pawls X V W, and the lever B', substantially as herein shown and described, for applying power to the chains or cords T to check or hold a horse, as set forth.

2. The combination, with the body and axle H D and the shaft R and its attachments, of the fast and loose pulleys P Q, the belt or chain N, the pulley and shaft M K, and the gear-wheels J I, substantially as herein shown and described, so that power may be applied to the chains or cords T to check or hold a horse.

ISAAC JONES WARNER.

Witnesses:
JAMES T. GRAHAM,
C. SEDGWICK.